United States Patent
Koker et al.

(10) Patent No.: US 7,089,367 B1
(45) Date of Patent: Aug. 8, 2006

(54) REDUCING MEMORY ACCESS LATENCIES FROM A BUS USING PRE-FETCHING AND CACHING

(75) Inventors: Altug Koker, Rancho Cordova, CA (US); Russell W. Dyer, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 608 days.

(21) Appl. No.: 09/372,296

(22) Filed: Aug. 11, 1999

(51) Int. Cl.
*G06F 12/00* (2006.01)

(52) U.S. Cl. .................. 711/137; 711/154; 711/133; 711/159; 707/204

(58) Field of Classification Search ............... 711/137, 711/204, 213, 133, 154, 159; 707/204
See application file for complete search history.

(56) References Cited

U.S. PATENT DOCUMENTS

| | | | | |
|---|---|---|---|---|
| 5,309,451 A | * | 5/1994 | Noya et al. ................. | 714/766 |
| 5,408,644 A | * | 4/1995 | Schneider et al. ............. | 714/1 |
| 5,542,058 A | * | 7/1996 | Brown, III et al. ......... | 713/502 |
| 5,724,613 A | * | 3/1998 | Wszolek ....................... | 710/33 |
| 5,802,569 A | * | 9/1998 | Genduso et al. ............ | 711/137 |
| 5,867,683 A | * | 2/1999 | Witt et al. .................... | 712/218 |
| 6,216,208 B1 | * | 4/2001 | Greiner et al. .............. | 711/137 |
| 6,356,962 B1 | * | 3/2002 | Kasper ......................... | 710/29 |

OTHER PUBLICATIONS

Microsoft Press, Computer Dictionary (Third edition).*

* cited by examiner

*Primary Examiner*—Mano Padmanabhan
*Assistant Examiner*—Jasmine Song
(74) *Attorney, Agent, or Firm*—Blakley, Sokoloff, Taylor & Zafman LLP

(57) ABSTRACT

The present invention is a method and apparatus to reduce latency in accessing a memory from a bus. The apparatus comprises a pre-fetcher and a cache controller. The pre-fetcher pre-fetches a plurality of data from the memory to a cache queue in response to a request. The cache controller is coupled to the cache queue and the pre-fetcher to deliver the pre-fetched data from the cache queue to the bus in a pipeline chain independently of the memory.

21 Claims, 10 Drawing Sheets

REDUCING MEMORY ACCESS LATENCIES FROM A BUS USING PRE-FETCHING AND CACHING

BACKGROUND

1. Field of the Invention

This invention relates to microprocessors. In particular, the invention relates to reducing latency in memory accesses.

2. Description of Related Art

Highly demanding applications such as multimedia and graphics have created a bottleneck in microprocessor systems due to their high bandwidth requirements between the processing devices and the system memory. To provide efficient usage of the system memory, fast peripheral buses have been developed to allow peripheral devices to access the system memory efficiently.

Traditionally, all bus accesses to the system memory are checked against the processor's cache to get the most updated data. This checking on the bus is referred to as bus snooping. The disadvantages of the bus snooping include long initial latencies to access the system memory. Accesses that are initiated on the bus, therefore, still suffer long latencies, especially for read accesses.

Therefore there is a need in the technology to provide a simple and efficient method to reduce latencies for bus accesses to system memory.

SUMMARY

The present invention is a method and apparatus to reduce latency in accessing a memory from a bus. The apparatus comprises a pre-fetcher and a queue controller. The pre-fetcher pre-fetches a plurality of data from the memory to a data queue in response to a request. The queue controller is coupled to the data queue and the pre-fetcher to deliver the pre-fetched data from the data queue to the bus in a pipeline chain independently of the memory.

BRIEF DESCRIPTION OF THE DRAWINGS

The features and advantages of the present invention will become apparent from the following detailed description of the present invention in which.

DESCRIPTION

The present invention is a method and apparatus for reducing bus access latencies. The technique includes pre-fetching and caching of data from the memory in a pipeline chain. Separate independent functional blocks operate in the pipeline chain to hide the latencies for consecutive accesses. In addition, initial latency due to non-consecutive accesses is eliminated by data purging.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

In the following description, the use of the Peripheral Component Interconnect (PCI) bus is merely for illustrative purposes. Furthermore, although the preferred embodiments work best for a read access, other types of access can also be supported.

The present invention uses an early fetching (or pre-fetching) mechanism with deep buffering to hide the latency due to usage of different protocols. There are essentially two types of latency: one is due to the initial burst read request for consecutive memory locations, and one is due to the subsequent data transfers. The initial latency is reduced by caching and the subsequent latency is reduced by pre-fetching.

Caching and pre-fetching reduce the initial latency and subsequent latency. After a bus-to-memory read stream is completed, the pre-fetched data are kept in a read data queue. If the consecutive bus-to-memory read is a follow-on to the initial read, the read cycle continues from where the initial read left off. For subsequent data transfers, a watermark level is determined by calculating the amount of data that could have been transferred during the latency time on the bus interface. This is the amount of data that needs to be pre-fetched to keep a continuous data transfer stream. By delivering data continuously from the local data queue independently of the memory, latency due to subsequent data transfers is reduced.

The bus access latencies are reduced by the use of small pipeline functional blocks in a bus access manager. These blocks are closely coupled together to form a pipeline chain. They operate independently with isolated functions.

Figure 1:
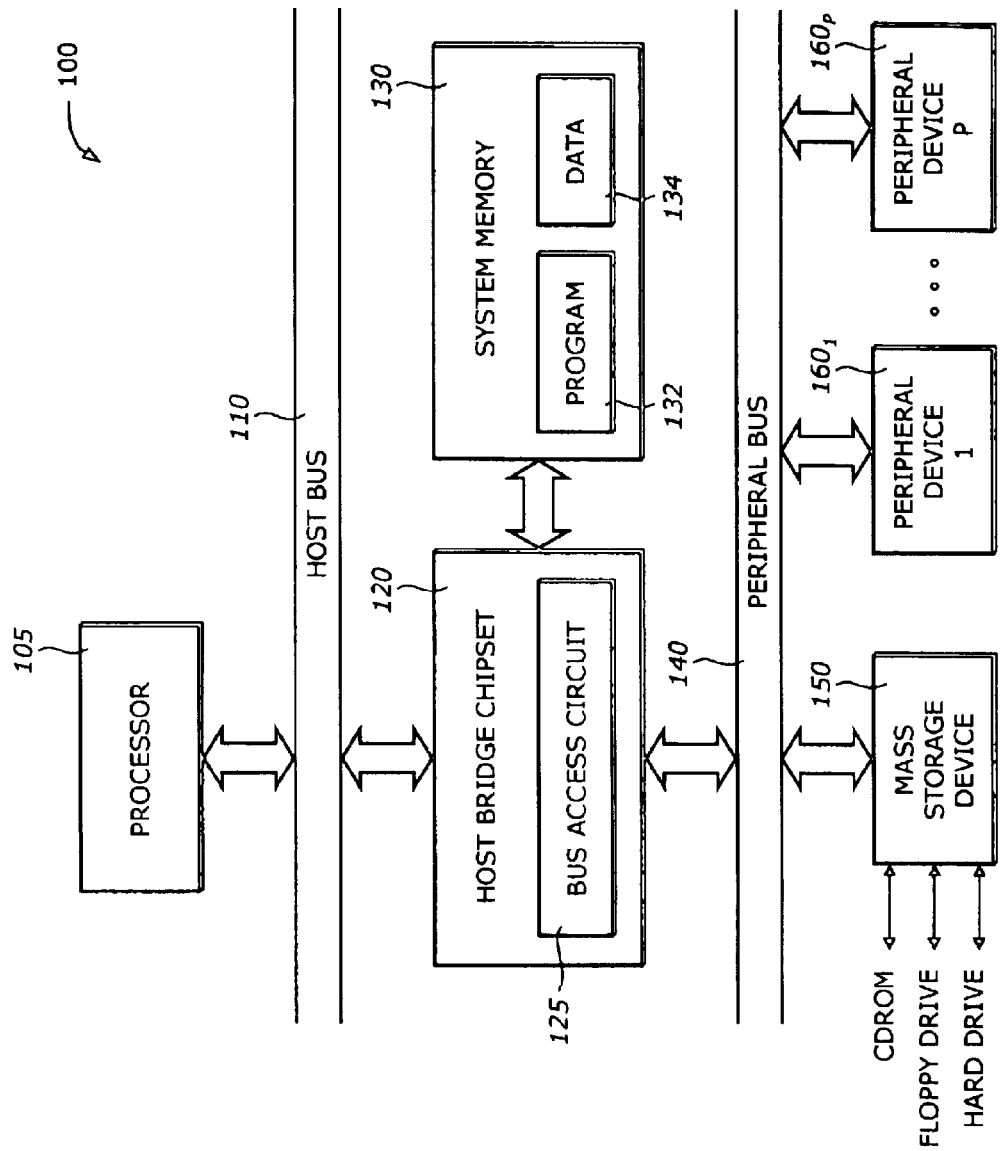
FIG. 1 is a diagram illustrating a system in which one embodiment of the invention can be practiced.

FIG. 1 is a diagram illustrating a computer system 100 in which one embodiment of the invention can be practiced. The computer system 100 include a processor 105, a host bus 110, a host bridge chipset 120, a system memory 130, a peripheral bus 140 P peripheral devices 160$_1$ to 160$_P$, and a mass storage device 150.

The processor 105 represents a central processing unit of any type of architecture, such as complex instruction set computers (CISC), reduced instruction set computers (RISC), very long instruction word (VLIW) explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the peripheral bus 140. The host bridge chipset 120 includes a bus access circuit 125 to manage the bus accesses by peripheral devices to the system memory 130. The system memory 130 represents one or more mechanisms for storing information. For example, the system memory 130 may include non-volatile or volatile memories. Examples of these memories include flash memory, read only memory (ROM), or random access memory (RAM). The system memory 130 includes a program 132 and a data 134. Of course, the system memory 130 preferably contains additional software (not shown), which is not necessary to understanding the invention.

The peripheral devices 160$_1$ to 160$_p$ are connected to the peripheral bus 140 to perform peripheral tasks. Examples of peripheral devices include a network interface and a media interface. The network interface connects to communication channel such as the Internet. The Internet provides access to on-line service providers, Web browsers, and other network channels. The media interface provides access to audio and video devices. The mass storage device 150 include CD ROM, floppy diskettes, and hard drives.

Figure 2:
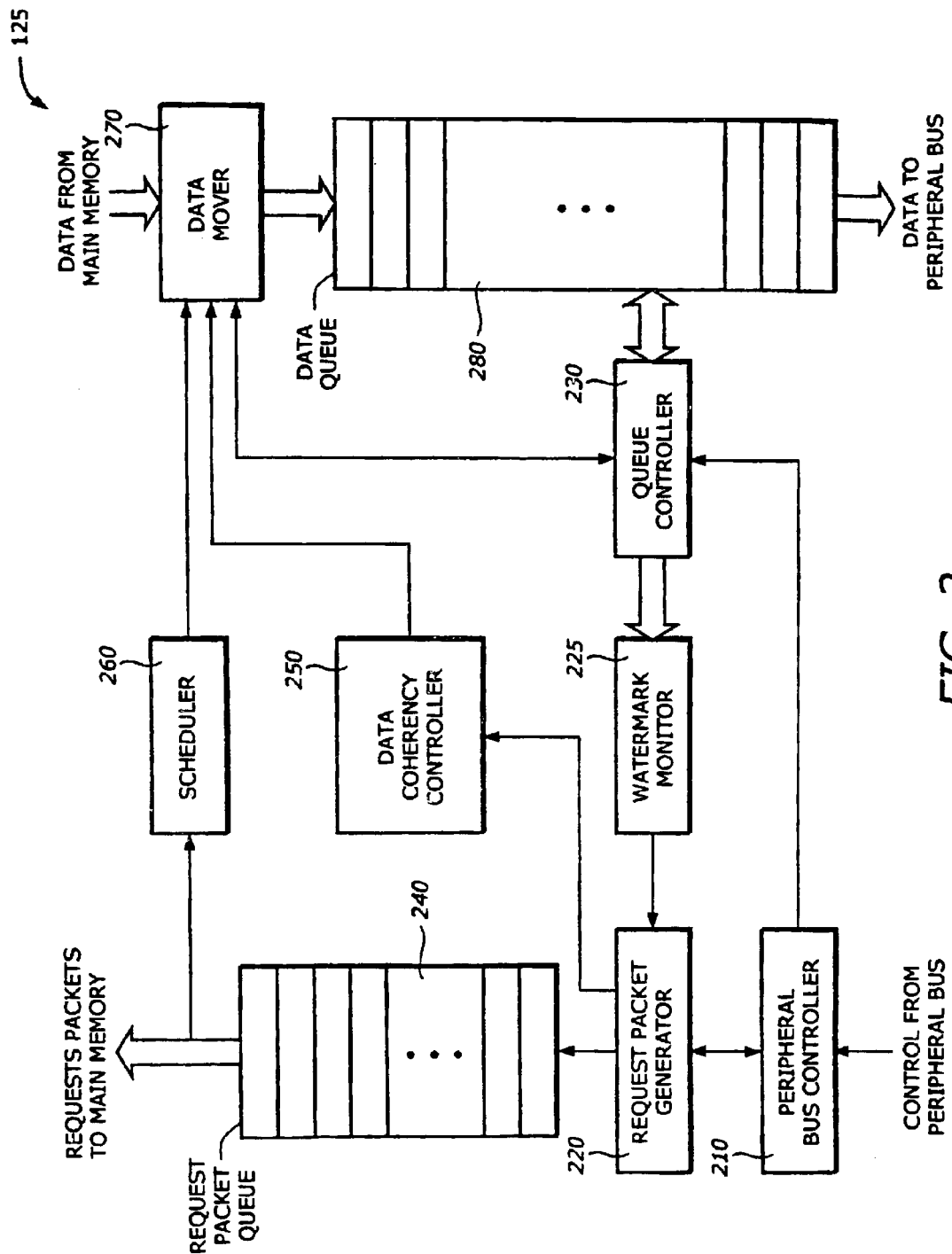
FIG. 2 is a diagram illustrating a bus access manager according to one embodiment of the invention.

FIG. 2 is a diagram illustrating a bus access circuit 125 according to one embodiment of the invention. The bus access circuit 125 includes a peripheral bus controller 210, a pre-fetcher 215, a queue controller 230, a data coherence controller 250, a scheduler 260, a data mover 270, and a data queue 280. The pre-fetcher 215 includes a request packet generator (RPG) 220, a watermark monitor 225, and a request queue (RQ) 240. These functional blocks are closely coupled together but perform isolated functions in a pipeline manner to provide high throughout and reduce bus access latencies.

The peripheral bus controller (PBC) 210 receives control and request signals from the peripheral bus and interfaces to the pre-fetcher 215 and the queue controller (QC) 230. The PBC 210 decodes the access request and determines if the access request is valid. If the access request is valid, the PBC 210 forwards the access request to the RPG 220 and to the QC 230. The QC 230 determines if there is a hit or a miss. The hit/miss detector can be performed by comparing the address of the request with the address range of the data queue. The RPG 220 returns a control signal to the PBC 210 for moving data from the cache queue 280 to the peripheral bus. Upon receipt of the control signal from the RPG 220, the PBC 210 sends a command to the QC 230 to start the data transfer from the data queue 280 to the peripheral bus.

The pre-fetcher 215 generates packet requests to a memory controller which provides access to the memory. The RPG 220 manages the bus-to-memory read transactions. When the RPG 220 receives the bus-to-memory read request from the PBC 210, it determines if the request results in a hit or a miss via the CC 230. The watermark monitor 225 determines if the amount of data in the data queue 280 is above a pre-determined level. The RPG 220 receives the information the watermark monitor 225 to interact with the PBC 210 in accepting bus requests.

If the request results in a hit, (e.g., the requested data item is in the data queue 280), the RPG 220 sends a control signal to the PBC 210 to enable the PBC 210 to start data transfer from the data queue 280. Then, the RPG 220 monitors the data level from the memory controller via the watermark monitor 225. As soon as the data level is detected to be below a predetermined watermark level, the RPG 220 places a new request into the request packet queue 240.

If the request results in a miss, the RPG 220 sends a stall control signal to the PBC 210 to prevent the PBC 210 to use the cached data. In addition, the RPG 220 generates a clear data signal or message to the data coherence controller (DCC) 250. This clear data signal is used to indicate a purge event. Then the RPG 220 generates a read request to the request queue 240. During this time, the RPG 220 generates as many requests as necessary so that the watermark level can be met with the up-coming data.

The queue controller (QC) 230 receives control information from the PBC 210 and interacts with the watermark monitor 225, the data mover 270, and the cache queue 280. The QC 230 manages the data allocation for the data queue 280 by monitoring the amount of data in the data 280. This information is forwarded to the data mover 270 for controlling data movement from the memory to the data queue 280. The QC 230 also controls the data movement from the data queue 280 to the peripheral bus by responding to the status information provided by the PBC 210.

The request queue (RQ) 240 stores the access requests as generated by the RPG 220 to optimize the transactions between the memory units and the bus units. The RQ 240 allows the memory units and the bus units operate independently. For example, as the RPG 220 generates a request packet for a bus-to-memory read, it does not have to wait for the existing packet to be executed by the memory controller. In this case, the RPG 220 merely shuffles the request into the RQ 240 and starts generating the next read request packet. The RQ 240, therefore, frees up the pipe stages from the long memory latencies.

The data coherence controller (DCC) 250 receives a control signal, (e.g., a clear data signal), from the RPG 220 and forward to the data mover 270, which in turn forwards to the QC 230. The QC 230 performs a data purge operation upon receiving this clear data signal.

The scheduler 260 keeps track of the read packets that are sent to the memory controller. The scheduler 260 receives the request packets from the RQ 240 and sends the request packets to the data mover 270 when the memory units return a data item. The main task of the scheduler 260 is to tag or mark a request packet entry with a purge tag when the RPG 220 generates a clear data signal to the DCC 250. On purge events, the scheduler 260 provides a pipeline stage where the previous read's data can be cleaned from the system, as the new read request is sent to the memory. In this way, the system is not required to clean the existing data before a new request is accepted from the peripheral bus. Therefore, the typical latency on a miss is eliminated.

The data mover (DM) 270 transfers the data from the memory to the bus. The DM 270 examines the entry retrieved from the scheduler 260 as it receives the data from the memory. If the entry is a normal entry, e.g., without a purge tag, the DM 270 moves the corresponding amount of data as indicated by the entry. When the data movement is done, the DM 270 removes the top entry from the scheduler 260. If the entry is tagged or marked with a purge tag, the DM 270 throws the data away as it arrives from the memory.

The data queue (DQ) 280 stores data items from the memory as transferred by the DM 270. The amount of data in the DQ 280 is monitored by the QC 230. The data items stored in the DQ 280 are read out to the peripheral bus when the QC 230 determines that there is a hit upon receiving a read request from the bus as generated by the PBC 210, or when the missed data are transferred from the memory to the DQ 280.

Activities in the bus access circuit 125 includes bus decode by the PBC 210, cache check by the QC 230, request generation by the RPG 220, data move and purging by the scheduler 260 and the DM 270, and data delivery and caching by the QC 230 and the DQ 280. These activities can be illustrated in a timing diagram for a particular access request.

Figure 3A:
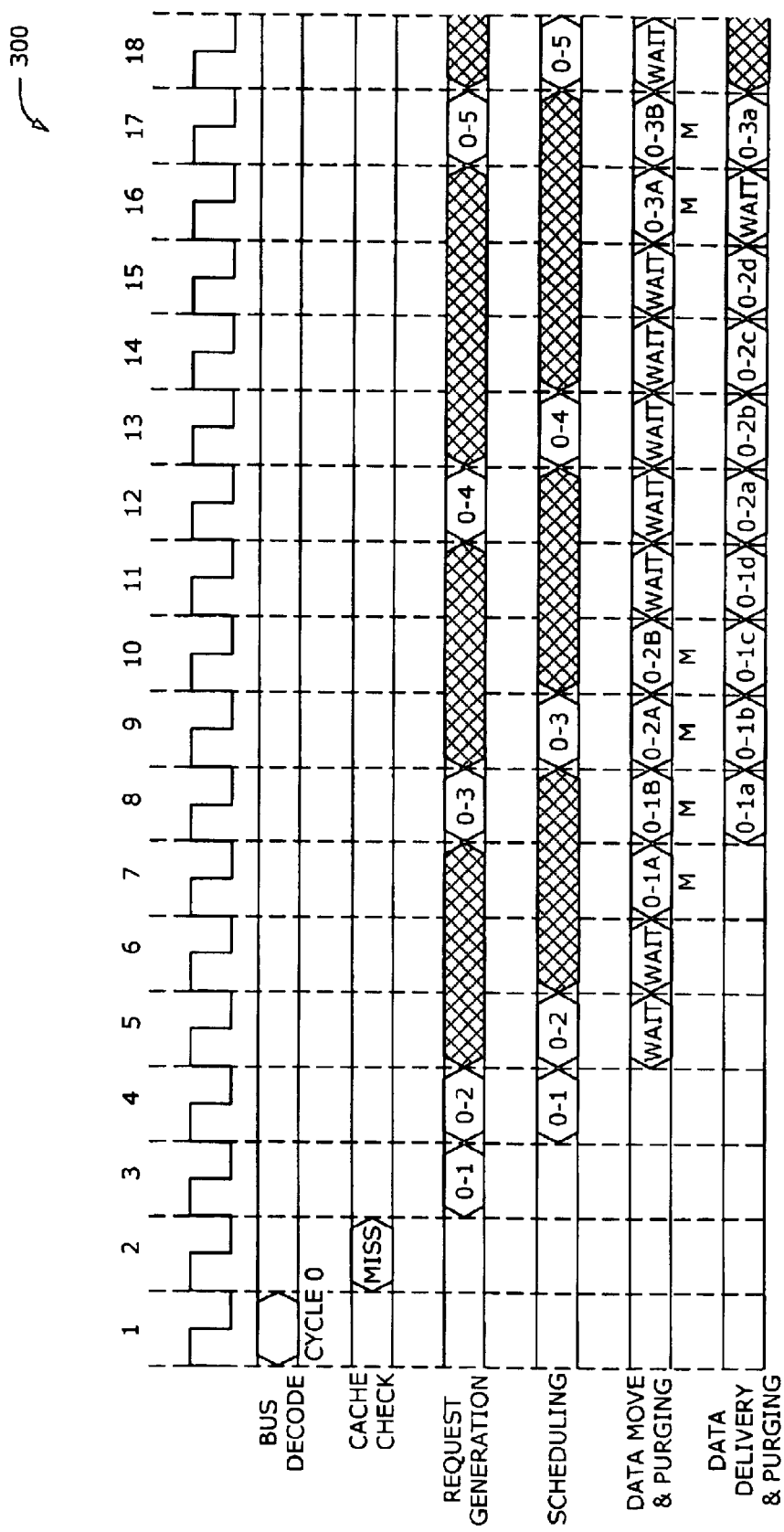
FIG. 3A is a timing diagram illustrating a miss cycle according to one embodiment of the invention.

FIG. 3A is a timing diagram 300A illustrating a miss cycle according to one embodiment of the invention. The timing diagram 300A illustrates a sequence of activities or events on a per clock basis from clocks 1 through 18 for an access request that results in a miss.

At clock 1, the bus decode decodes the access request from the bus and generates a valid access request CYLCLE0. At clock 2, the cache check determines that the access request results in a MISS.

The request generation generates the request of the cycle 0 for the data items 1, 2, 3, 4, and 5 at clocks 3, 4, 8, 12, and 17, respectively. The scheduling retrieves the request packets of data items 1, 2, 3, 4, and 5 for the cycle 0 at clocks 4, 5, 9, 13, and 18, respectively. The request packets are retrieved with a one-clock delay.

The data move and purging begins to move the data from the memory at clocks 7, 8, 9, 10, 16, and 17, for the data items 1, 2 and 3. In this exemplary embodiment, the request is for a 32-byte data. For each scheduled 32-byte request, two 16-byte requests are generated. For example, in clock 7 the first 16 byte data of the packet 1 in cycle 0, indicated as 0_1A, is moved into the cache queue. In clock 8, the second 16-byte of the packet 1 in cycle 0, indicated as 0_1B, is moved next. The WAIT periods in clocks 5, 6, 11–15, and 18 are examples of a heavily loaded system.

The data delivery and caching starts delivering the requested data items from the cache queue. In this exemplary embodiment, each 32-byte request has 4 clocks of data phase, each data phase transfers 8 bytes. The four data phases are indicated by the lower case labels a, b, c, and d. For example, clocks 8 through clock 12, four data phases for the data item 1 in cycle 0 are transferred and are labeled as 0_1a, 0_1b, 0_1c, 0_1d.

Figure 3B:
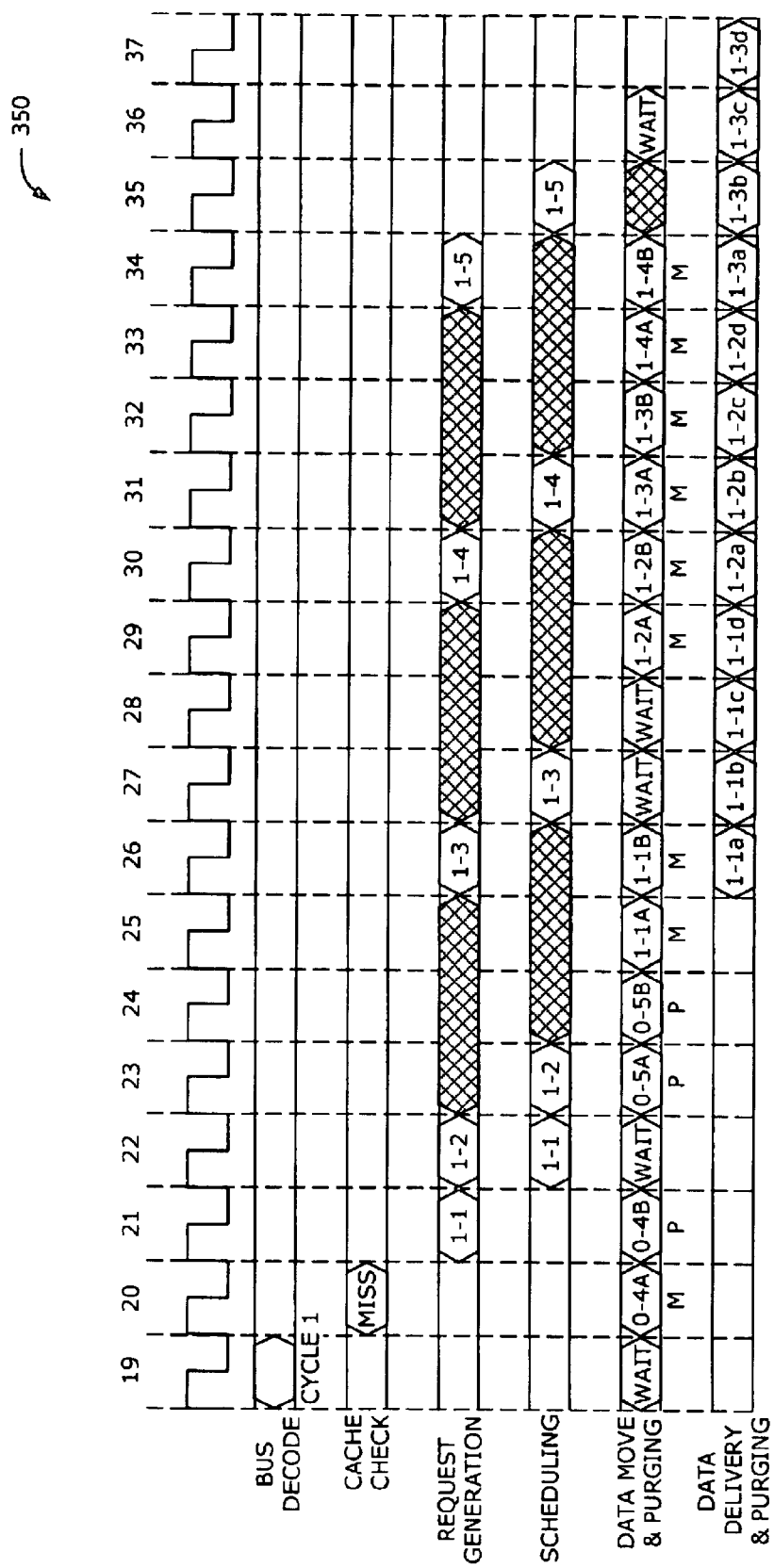
FIG. 3B is a timing diagram illustrating a miss cycle subsequent to a miss cycle shown in FIG. 3A according to one embodiment of the invention.

FIG. 3B is a timing diagram 300B illustrating a miss cycle subsequent to a miss cycle shown in FIG. 3A according to one embodiment of the invention. The timing diagram 300B illustrates a sequence of activities or events on a per clock basis from clocks 19 through 20 for an access request that results in a miss subsequent to cycle 0 shown in FIG. 3A.

At clock 19, the bus decode decodes the access request from the bus and generates a valid access request CYLCLE1. At clock 20, the cache check determines that the access request results in a MISS.

The request generation generates the request of the cycle 1 for the data items 1, 2, 3, 4, and 5 at clocks 21, 22, 26, 30, and 34, respectively. The scheduling retrieves the request packets of data items 1, 2, 3, 4, and 5 for the cycle 1 at clocks 22, 23, 27, 31 and 35, respectively. The request packets are retrieved with a one-clock delay.

The data move and purging continues to move and purge the data from the previous cycle. At clock 20, the data item 4A of cycle 0 is moved into the queue. At clock 21, it is determined that the data item 0_4B is purged. The two clocks 23 and 24 also purge data items 0_5A and 0_5B. Thereafter, the data items for the cycle 1 are moved into the cache queue.

The data delivery and caching starts delivering the requested data items from the cache queue as soon as the data are moved into the cache queue. Due to the purging events at clocks 21, 23, and 24, the data delivery and caching starts delivering data for cycle 1 immediately after the data are moved into the cache queue. The data items 1_1a, 1_1b, 1_1c, 1_1d, . . . , 1_3a, 1_3b, 1_3c, and 1_3d are delivered at clocks 26, 27, 28, 29, . . . , 34, 35, 36, and 37, respectively.

As seen from the timing diagram, when there are consecutive miss cycles, the data delivery throughput is not worse than the normal system. The performance benefit of the pre-fetched caching mechanism is in the hit accesses as illustrated next.

Figure 4A:
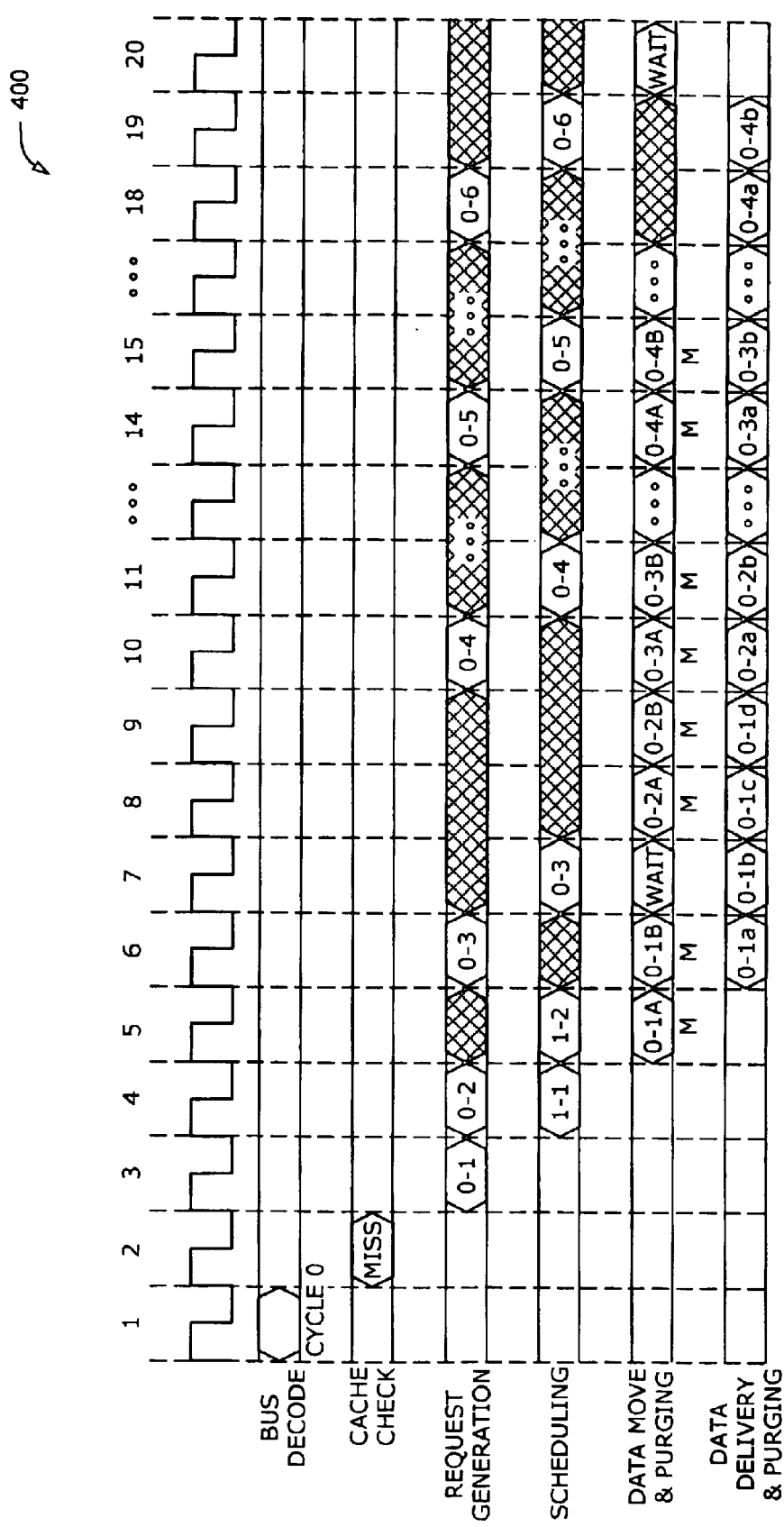
FIG. 4A is a timing diagram illustrating a miss cycle according to one embodiment of the invention.

FIG. 4A is a timing diagram 400A illustrating a miss cycle according to one embodiment of the invention. The timing diagram 400A illustrates a sequence of activities or events on a per clock basis from clocks 1 through 20 for an access request that results in a miss.

At clock 1, the bus decode decodes the access request from the bus and generates a valid access request CYLCLE0. At clock 2, the cache check determines that the access request results in a MISS.

The request generation generates the request of the cycle 0 for the data items 1, 2, 3, 4, 5 and 6 at clocks 3, 4, 6, 10, 14, and 18, respectively. The scheduling retrieves the request packets of data items 1, 2, 3, 4, 5 and 6 for the cycle 0 at clocks 4, 5, 7, 11, 15, and 19, respectively. The request packets are retrieved with a one-clock delay.

The data move and purging begins to move the data from the memory at clocks 4, 5, 8, 9, 10, 11, 14, 15, 16, and 17 for the data items 1, 2, 3, 4 and 5. In this exemplary embodiment, the request is for a 32-byte data. For each scheduled 32 byte request, two 16-byte requests are generated. For example, in clock 5 the first 16-byte data of the packet 1 in cycle 0, indicated as 0_1A, is moved into the cache queue. In clock 6, the second 16-byte of the packet 1 in cycle 0, indicated as 0_1B, is moved next.

The data delivery and caching starts delivering the requested data items from the cache queue from clocks 6 through 19. For example, in clocks 6 through 9, each of the four data phases 0_1a, 0_1b, 0_1c, 0_1d corresponds to an 8-byte data transfer. Due to pipelining, the data delivery of all the 6 requested data items goes through the next access cycle, CYCLE, as shown in FIG. 4B.

Figure 4B:
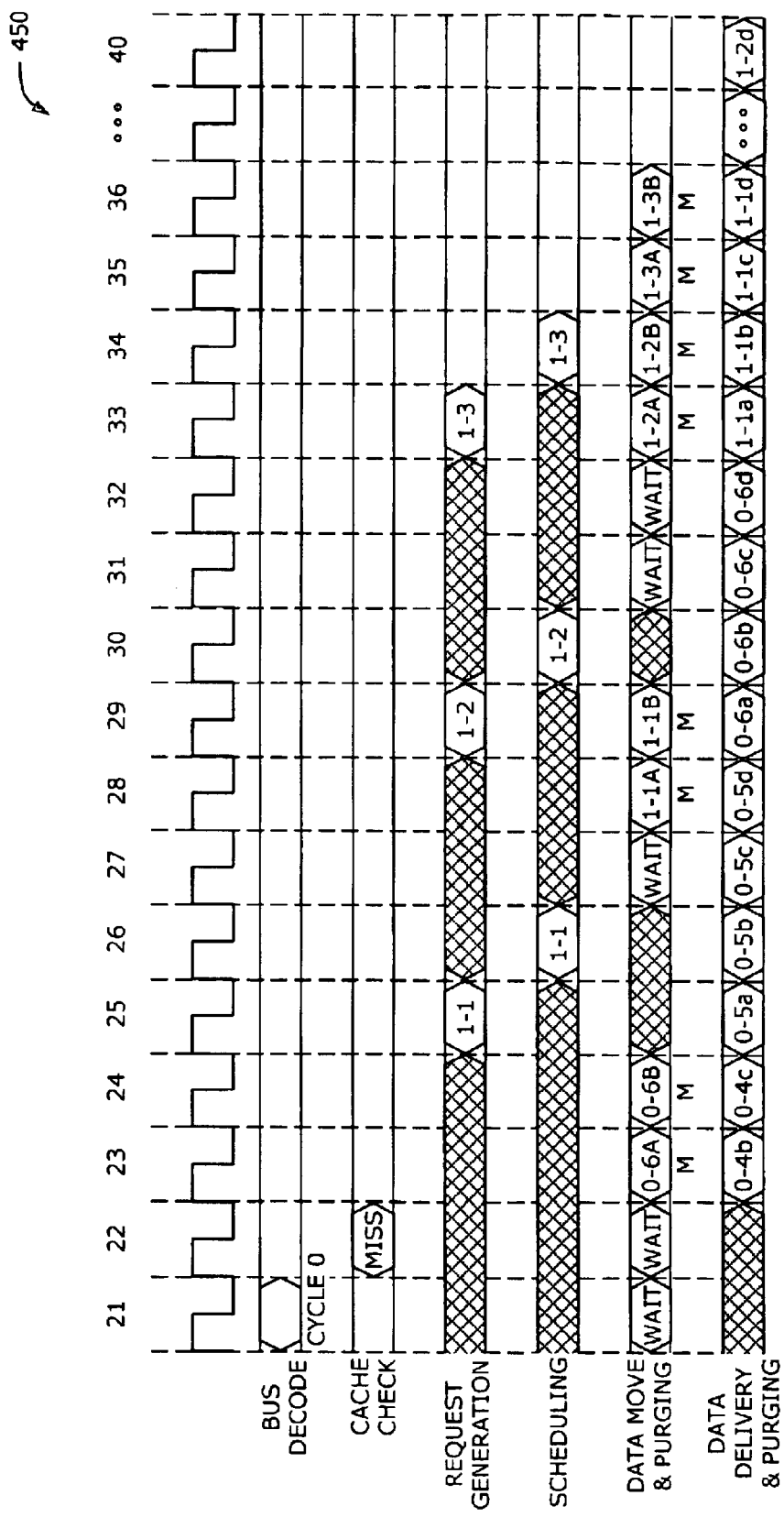
FIG. 4B is a timing diagram illustrating a hit cycle subsequent to a miss cycle shown in FIG. 4A according to one embodiment of the invention.

FIG. 4B is a timing diagram 400B illustrating a hit cycle subsequent to a miss cycle shown in FIG. 4A according to one embodiment of the invention. The timing diagram 400B illustrates a sequence of activities or events on a per clock basis from clocks 21 through 40 for an access request that results in a hit subsequent to cycle 0 shown in FIG. 4A.

At clock 21, the bus decode decodes the access request from the bus and generates a valid access request CYLCLE1. At clock 22, the cache check determines that the access request results in a HIT.

The request generation generates the request of the cycle 1 for the data items 1, 2, and 3 at clocks 25, 29, and 33, respectively. The scheduling retrieves the request packets of data items 1, 2, and 3 for the cycle 1 at clocks 26, 30, and 34, respectively. The request packets are retrieved with a one-clock delay.

The data move and purging continues to move and purge the data from the previous cycle. At clocks 23 and 24, the data item 0_6A and 0_6B are moved into the queue. Thereafter, the data are moved for the cycle 1: 1_1A and 1_1B at clocks 28 and 29, 1_2A and 1_2B at clocks 33 and 34, 1_3A and 1_3B at clocks 35 and 36, etc.

The data delivery and caching starts delivering the requested data items from the cache queue as soon as the data are moved into the cache queue. The data delivery continues from the previous cycle to deliver the data items 0_4b, 0_4c, 0_5a, 0_5b, 0_5c, 0_5d, 0_6a, 0_6b, 0_6c, 0_6d from clocks 23 through 32. Thereafter, the data delivery immediately delivers the data items for the cycle 1 starting from clock 33. The delivery of the data items 1_1a, 1_1b, 1_1c, 1_1d, etc, takes place without any latency because the requested data are already moved into the cache queue.

As seen from the timing diagram, when there is a hit cycle, the performance is significantly improved compared to traditional methods. The latency is reduced and/or eliminated.

Figure 5:
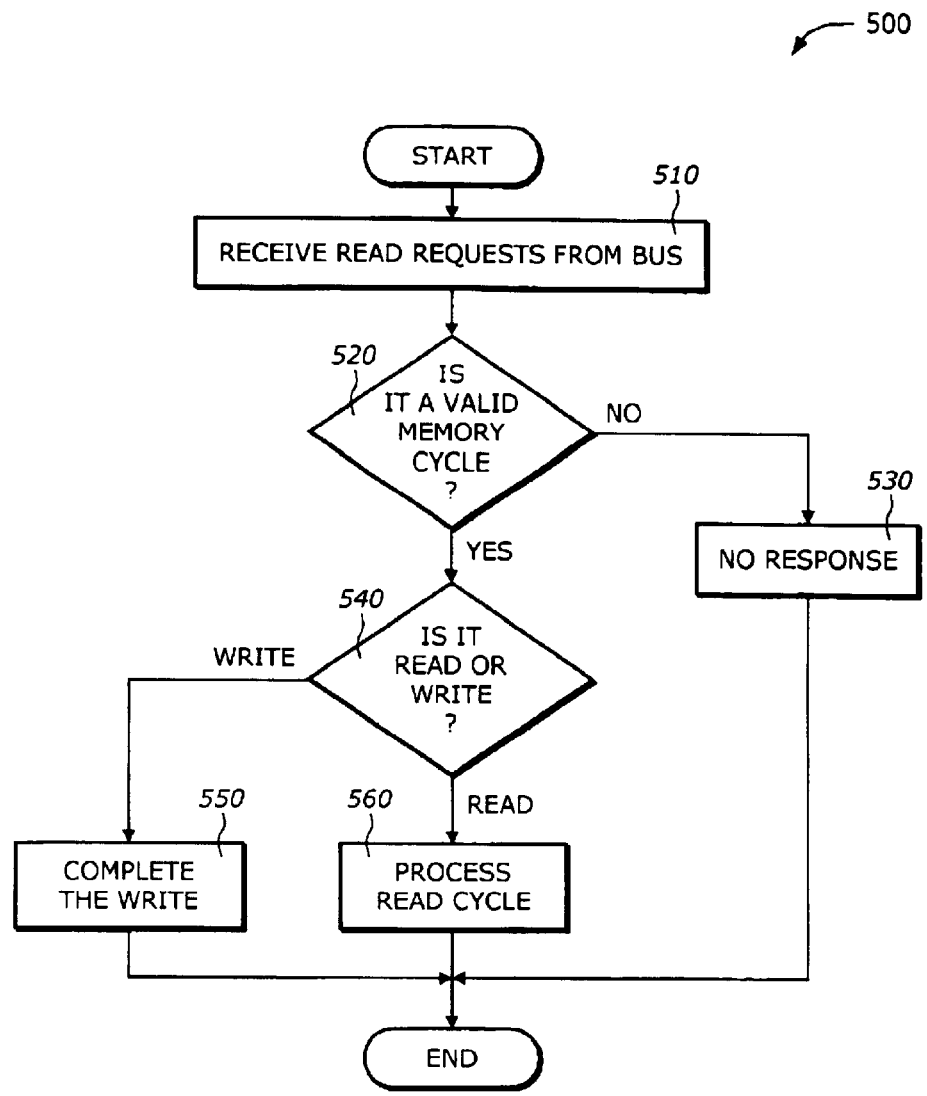
FIG. 5 is a flowchart illustrating a process to manage a bus access request according to one embodiment of the invention.

FIG. 5 is a flowchart illustrating a process 500 to manage a bus access request according to one embodiment of the invention.

At START, the process 500 receives the read request by a bus master from the bus (Block 510). The process 500 determines if the request is a valid memory cycle (Block 520). This is done by decoding the address and checking if the decoded address is within the correct memory range. If the request is not valid, the process 500 aborts the cycle by terminating the cycle without a response (Block 530). The process 500 is then terminated. If the request is valid, the process 500 determines if the access is a read or a write (Block 540). If it is a write, the process 500 completes the write accordingly (Block 550) and is then terminated. If it is a read, the process 500 proceeds to process the requested read cycle (Block 560) and is then terminated. The process to perform the read cycle at Block 560 is explained in FIG. 6.

Figure 6:
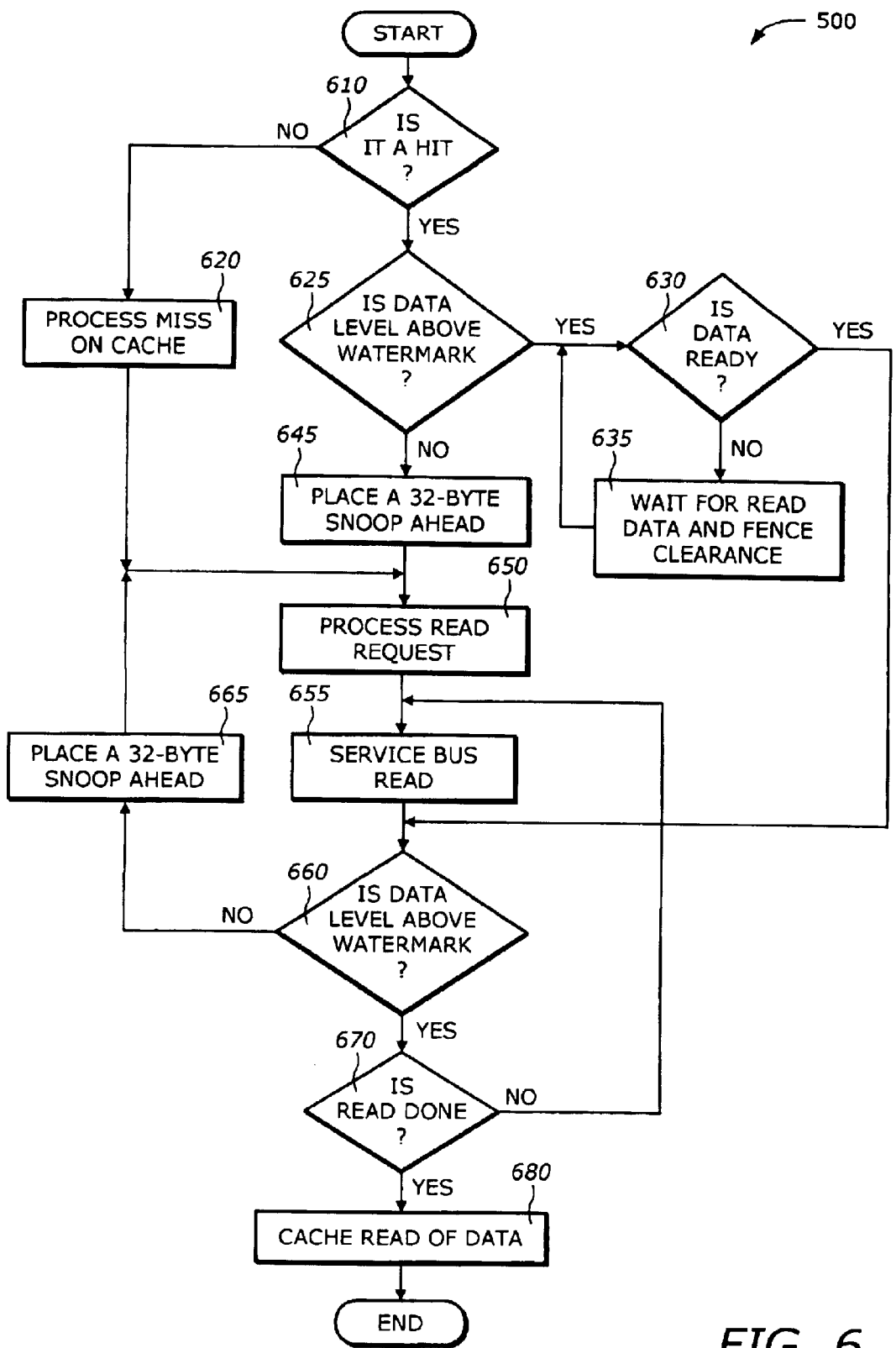
FIG. 6 is a flowchart illustrating a process to perform a read cycle according to one embodiment of the invention.

FIG. 6 is a flowchart illustrating a process 560 to perform a read cycle according to one embodiment of the invention.

At START, the process 560 determines if the access results in a hit (Block 610). If no, the process 560 processes the access as a miss on cache (Block 620) and then proceeds to block 650. The process to handle the miss on cache (Block 620) is explained later in FIG. 7. If the access results in a hit, the process 560 determines if the data level is above the watermark level (Block 625). The watermark level is programmable by software and is predetermined. If the data level is not above the watermark level, the process 560 places a 32-byte snoop ahead (Block 645) and proceed to block 650. If the data level is above the watermark level, the process 560 determines if the data is ready (Block 630). The data may have wait states although the cycle resulted in a hit. These wait states may be inserted on the memory interface depending on memory loads. If the data is ready, the process 560 services the bus read (Block 640) and then goes to block 660. If the data is not ready, the process 560 waits for the read data and fences for clearance (Block 635), then the process 560 returns back to block 630.

At block 650, the process 560 processes the read request. The processing of the read request in block 650 is explained later in FIG. 8. Then the process 650 services the bus read (Block 655). Then the process 560 determines if the data level is above the watermark level (Block 660). If not, the process places a 32 byte snoop ahead (Block 665) and returns back to block 650. If the data level is above the watermark, the process 560 determines if the read is done (Block 670). If not, the process 560 returns to block 655 to service the bus read. If the read is done, the process 560 performs cache read of the data (Block 680) and is then terminated.

Figure 7:
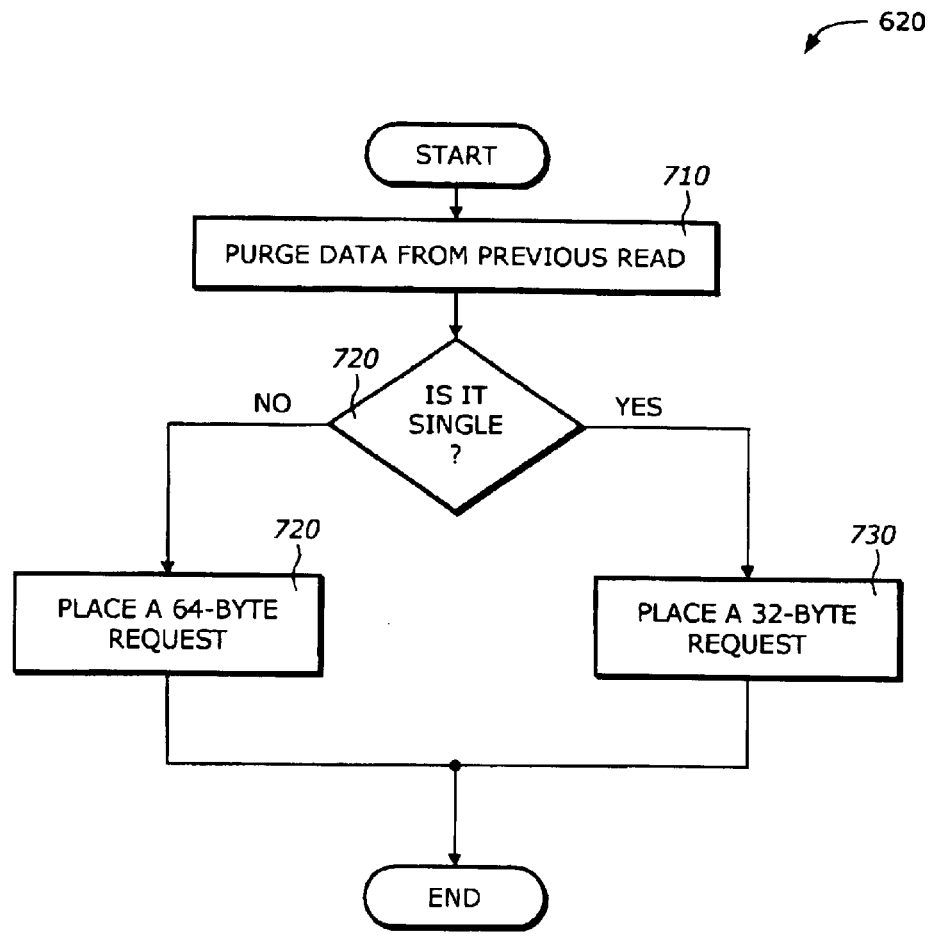
FIG. 7 is a flowchart illustrating a process to perform a miss read cycle according to one embodiment of the invention.

FIG. 7 is a flowchart illustrating a process 620 to perform a miss read cycle according to one embodiment of the invention.

Upon START, the process 620 purges the data from the previous read cycle (Block 710) because when the access results in a miss the cached data needs to be cleaned from the system. Then the process 620 determines if the request is a single request (Block 720). If yes, the process 620 places a 32-byte request (Block 730) and is terminated. If no, the process 620 places a 64-byte request (Block 740) and is then terminated.

Figure 8:
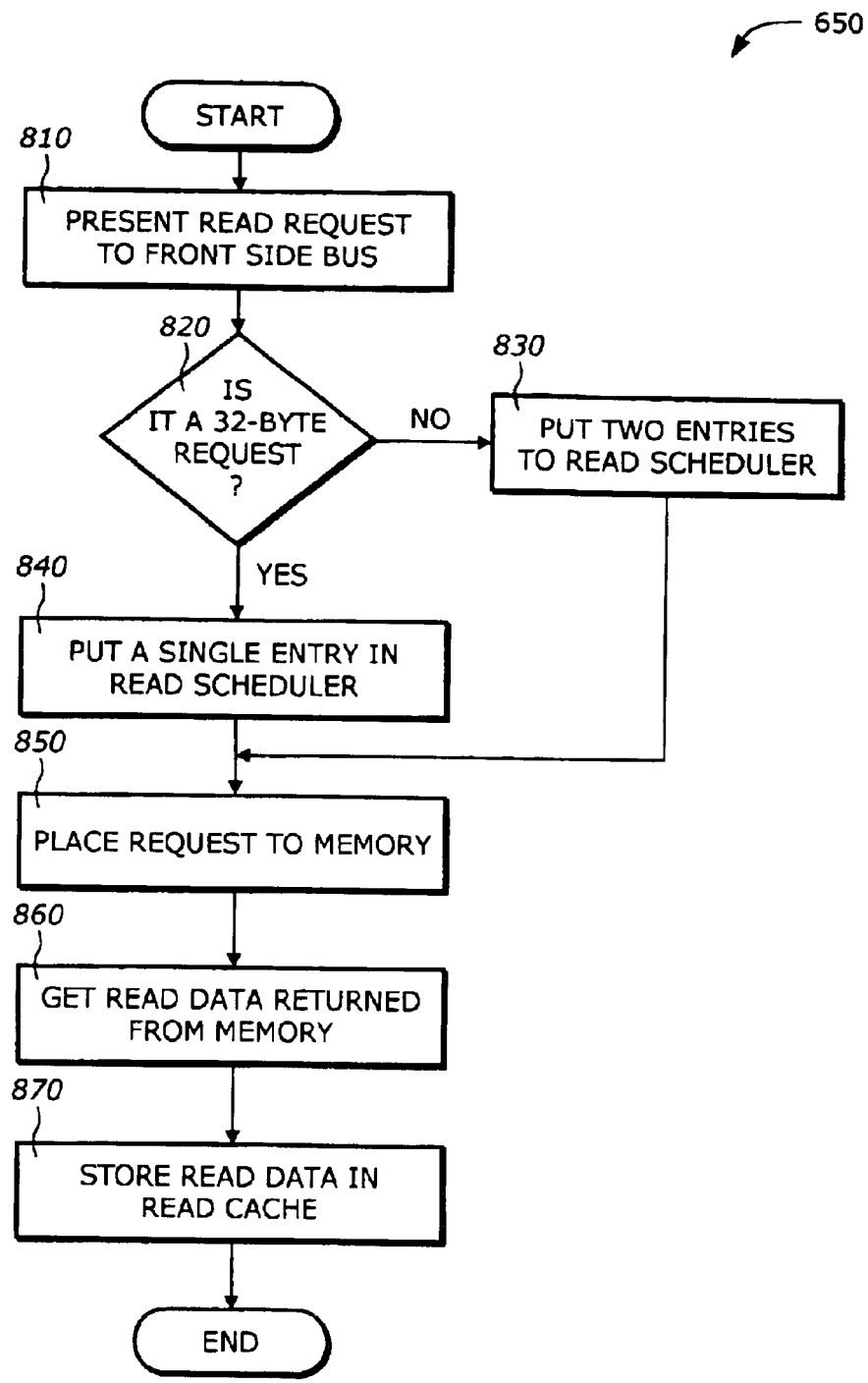
FIG. 8 is a flowchart illustrating a process to perform a hit read cycle according to one embodiment of the invention.

FIG. 8 is a flowchart illustrating a process 650 to perform a hit read cycle according to one embodiment of the invention.

Upon START, the process 650 presents the read request to the front side bus (Block 810). This is performed when the system has a level 2 cache (L2) and therefore needs snooping. Then, the process 650 determines if the request is a 32-byte request (Block 820). If not, the process 650 put two entries in the read scheduler (Block 830) and then goes to block 850. Otherwise, the process puts a single entry in the read scheduler (Block 840).

Next, the process 650 places the request to the memory (Block 850). This is done by the request packet generator RPG 220 and the request queue RQ 240 as shown in FIG. 2. Then, the process 650 gets the read data returned from the memory (Block 860). Next, the process 650 stores the read data in the read data queue (Block 870) and is then terminated.

Thus, the present invention is a technique to manage bus accesses using a pre-fetching and caching mechanism. The technique uses independent functional blocks in a pipeline manner to reduce latencies.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   pre-fetching a plurality of data from a memory to a data queue in response to a request;
   delivering the pre-fetched data from the data queue to a bus independently of the memory;
   marking an entry in a scheduler according to a purge signal if the request results in a cache miss; and
   purging data corresponding to the marked entry.

2. The method of claim 1 wherein pre-fetching comprises:
   determining if an amount of data in the data queue is above a predetermined level; and
   placing the request to a memory controller controlling the memory if the amount of data is not above the predetermined level, the request causing the memory controller to transfer the plurality of data to the data queue, the request being buffered in a request queue.

3. The method of claim 2 wherein the delivering comprises:
   transferring the data from the data queue to the bus if the data in the data queue is ready.

4. The method of claim 1 further comprising:
   determining if the request is valid.

5. The method of claim 1 further comprising
   providing the purge signal; and placing the request to the memory controller.

6. The method of claim 1 wherein the bus is a peripheral component interconnect (PCI) bus.

7. The method of claim 1 wherein the request is one of a 32-byte and a 64-byte requests.

8. An apparatus comprising:
a pre-fetcher to pre-fetch a plurality of data from a memory to a data queue in response to a request;
a queue controller coupled to the data queue and the pre-fetcher to deliver the pre-fetched data from the data queue to a bus independently of the memory;
a data coherence controller coupled to the data coherence controller to store entries corresponding to the request, the entries being marked according to the purge signal from the data coherence controller, the marked entries corresponding to data to be purged.

9. The apparatus of claim 8 wherein the pre-fetcher comprises:
a watermark monitor to determine if an amount of data in the data queue is above a predetermined level;
a request packet generator coupled to the watermark monitor to place the request to a memory controller controlling the memory if the amount of data is not above the predetermined level, the request causing the memory controller to transfer the plurality of data to the data queue; and
a request queue coupled to the request packet generator to store the request provided by the request packet generator.

10. The apparatus of claim 9 wherein the queue controller transfers the data from the data queue to the bus if the data in the data queue is ready.

11. The apparatus of claim 9 further comprising:
a peripheral bus controller coupled to the bus and the pre-fetcher to determine if the request is valid.

12. The apparatus of claim 8 further comprising:
a data mover coupled to the data queue and the scheduler to transfer data from the memory to the data queue, the data mover purging data corresponding to one of the marked entries from the scheduler.

13. The apparatus of claim 8 wherein the bus is a peripheral component interconnect (PCI) bus.

14. The apparatus of claim 8 wherein the request is one of a 32-byte and a 64-byte requests.

15. A system comprising:
a memory;
a bus; and
a bus access circuit coupled to the memory and the bus to reduce latency in accessing the memory from the bus, the bus access circuit including:
a pre-fetcher to pre-fetch a plurality of data from the memory to a data queue in response to a request,
a queue controller coupled to the data queue and the pre-fetcher to deliver the pre-fetched data from the data queue to the bus independently of the memory,
a data coherence controller coupled to the pre-fetcher to provide a purge signal when the request corresponds to a cache miss, and
a scheduler coupled to the data coherence controller to store entries corresponding to the request, the entries being marked according to the purge signal from the data coherence controller, the mark entries corresponding to data to be pursed.

16. The system of claim 15 wherein the pre-fetcher comprises:
a watermark monitor to determine if an amount of data in the data queue is above a predetermined level;
a request packet generator coupled to the watermark monitor to place the request to a memory controller controlling the memory if the amount of data is not above the predetermined level, the request causing the memory controller to transfer the plurality of data to the data queue; and
a request queue coupled to the request packet generator to store the request provided by the request packet generator.

17. The system of claim 16 wherein the queue controller transfers the data from the data queue to the bus if the data in the data queue is ready.

18. The system of claim 15 wherein the bus access circuit further comprises:
a peripheral bus controller coupled to the bus and the pre-fetcher to determine if the request is valid.

19. The system of claim 15 wherein the bus access circuit further comprising:
a data mover coupled to the data queue and the scheduler to transfer data from the memory to the data queue, the data mover purging data corresponding to one of the marked entries from the scheduler.

20. The system of claim 15 wherein the bus is a peripheral component interconnect (PCI) bus.

21. The system of claim 15 wherein the request is one of a 32-byte and a 64-byte requests.

* * * * *

UNITED STATES PATENT AND TRADEMARK OFFICE
CERTIFICATE OF CORRECTION

| | | |
|---|---|---|
| PATENT NO. | : 7,089,367 B1 | |
| APPLICATION NO. | : 09/372296 | |
| DATED | : August 8, 2006 | |
| INVENTOR(S) | : Koker et al. | |

It is certified that error appears in the above-identified patent and that said Letters Patent is hereby corrected as shown below:

In column 6, at line 40, delete "CYCLE" and insert --CYCLE1--.

In column 9, at line 28, delete "9" and insert --8--.

Delete claim 8, and insert the following claim --An apparatus comprising: a pre-fetcher to pre-fetch a plurality of data from a memory to a data queue in response to a request; a queue controller coupled to the data queue and the pre-fetcher to deliver the pre-fetched data from the data queue to a bus independently of the memory; a data coherence controller coupled to the pre-fetcher to provide a purge signal when the request corresponds to a cache miss; and
a scheduler coupled to the data coherence controller to store entries corresponding to the request, the entries being marked according to the purge signal from the data coherence controller, the marked entries corresponding to data to be purged.--.

Signed and Sealed this

Tenth Day of June, 2008

JON W. DUDAS
*Director of the United States Patent and Trademark Office*